United States Patent
Hayashi et al.

(10) Patent No.: US 11,048,016 B2
(45) Date of Patent: Jun. 29, 2021

(54) FOREIGN SUBSTANCE DETECTION DEVICE, FOREIGN SUBSTANCE DETECTION METHOD AND RECORDING MEDIUM

(71) Applicant: Tokyo Electron Limited, Tokyo (JP)

(72) Inventors: Masato Hayashi, Koshi (JP); Kohei Noguchi, Koshi (JP); Daisuke Kajiwara, Koshi (JP); Koudai Higashi, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 16/478,908

(22) PCT Filed: Jan. 16, 2018

(86) PCT No.: PCT/JP2018/001019
§ 371 (c)(1),
(2) Date: Jul. 18, 2019

(87) PCT Pub. No.: WO2018/135487
PCT Pub. Date: Jul. 26, 2018

(65) Prior Publication Data
US 2019/0383963 A1    Dec. 19, 2019

(30) Foreign Application Priority Data
Jan. 20, 2017   (JP) .............................. JP2017-008734

(51) Int. Cl.
*G01V 8/12* (2006.01)
*G01N 15/06* (2006.01)
*G01N 15/00* (2006.01)

(52) U.S. Cl.
CPC ............... *G01V 8/12* (2013.01); *G01N 15/06* (2013.01); *G01N 2015/0053* (2013.01); *G01N 2015/0687* (2013.01); *G01N 2015/0693* (2013.01)

(58) Field of Classification Search
CPC ........ B29C 59/00; G01N 21/85; G01N 15/06; G01N 15/1459; G01N 15/1434;
(Continued)

(56) References Cited

U.S. PATENT DOCUMENTS 3,850,525 A * 11/1974 Kaye ...................... G01N 21/47
356/73
4,975,237 A * 12/1990 Watling .................... G01J 3/02
356/338
(Continued)

FOREIGN PATENT DOCUMENTS

JP    S63-292039 A    11/1988
JP    H10-115593 A     5/1998
(Continued)

OTHER PUBLICATIONS

International Search Report for PCT/JP2018/001019 dated Apr. 10, 2018.

*Primary Examiner* — Sang H Nguyen
(74) *Attorney, Agent, or Firm* — Pearne & Gordon LLP

(57) ABSTRACT

An apparatus includes flow path units 15A to 15K configured to form flow paths 17A to 17K through which a fluid supplied to a target object W is flown; a laser light irradiator 51 configured to irradiate a laser light into the flow path units such that an optical path intersects with a flow direction of the fluid in the flow path units; light receiving elements 45A and 45B provided at the optical path having passed through the flow path units; a detector 6 configured to detect the foreign substance in the fluid based on a signal from the light receiving elements; and a filter unit 57 provided at the
(Continued)

optical path between the light receiving elements and the flow path units, and configured to block a Raman scattered light and allow a Rayleigh scattered light to be transmitted to the light receiving elements.

8 Claims, 16 Drawing Sheets

(58) Field of Classification Search
CPC ... G01N 2015/0687; G01N 2015/0693; G01N 2015/0053; G01V 8/12
See application file for complete search history.

(56) References Cited

U.S. PATENT DOCUMENTS

| | | | | |
|---|---|---|---|---|
| 5,079,169 A * | 1/1992 | Chu | ............ | H05H 3/04 250/251 |
| 5,765,948 A * | 6/1998 | Sai | ............ | G01K 11/32 250/227.14 |
| 6,618,144 B1 * | 9/2003 | Reed | ............ | G01N 15/0211 356/336 |
| 6,778,269 B2 * | 8/2004 | Fink | ............ | G01J 3/44 356/301 |
| 8,877,507 B2 * | 11/2014 | Xia | ............ | B01L 9/06 436/43 |
| 2007/0114362 A1 * | 5/2007 | Feng | ............ | G01N 21/6428 250/208.1 |
| 2008/0094620 A1 * | 4/2008 | Li | ............ | G01J 3/44 356/301 |
| 2009/0002704 A1 | 1/2009 | Burns et al. | | |
| 2012/0004864 A1 * | 1/2012 | Tsukii | ............ | G01F 1/7086 702/49 |
| 2012/0081703 A1 * | 4/2012 | Moskovits | ............ | G01N 21/658 356/301 |
| 2012/0307238 A1 * | 12/2012 | Fujita | ............ | G02B 21/002 356/301 |
| 2013/0271760 A1 * | 10/2013 | Froigneux | ............ | G01J 3/021 356/301 |
| 2015/0276481 A1 * | 10/2015 | Liu | ............ | G01J 3/2823 356/301 |
| 2016/0358829 A1 * | 12/2016 | Hayashi | ............ | H01L 21/67253 |
| 2019/0094133 A1 * | 3/2019 | Fukutake | ............ | G01N 21/65 |

FOREIGN PATENT DOCUMENTS

| | | |
|---|---|---|
| JP | H11-173969 A | 7/1999 |
| JP | 2016-103590 A | 6/2016 |
| JP | 2016-225574 A | 12/2016 |

* cited by examiner

FOREIGN SUBSTANCE DETECTION DEVICE, FOREIGN SUBSTANCE DETECTION METHOD AND RECORDING MEDIUM

CROSS-REFERENCE TO RELATED APPLICATION

This Application is a U.S. national phase application under 35 U.S.C. § 371 of PCT Application No. PCT/JP2018/001019 filed on Jan. 16, 2018, which claims the benefit of Japanese Patent Application No. 2017-008734 filed on Jan. 20, 2017, the entire disclosures of which are incorporated herein by reference.

TECHNICAL FIELD

The various aspects and embodiments described herein pertain generally to a foreign substance detection device and a foreign substance detection method for optically detecting a foreign substance contained in a fluid which is to be supplied to a processing target object and a recording medium having a computer program for executing the foreign substance detection method.

BACKGROUND

A manufacturing process for a semiconductor device includes a process of performing a liquid processing on, for example, a semiconductor wafer (hereinafter, simply referred to as "wafer"). By way of example, in a process of forming a resist pattern, various kinds of chemical liquids such as a resist are used, and each chemical liquid is discharged onto the wafer via a nozzle after being supplied from a chemical liquid bottle through a pipeline, which is configured as a flow path, provided with a device such as a valve or the like. Here, a particle adhering to the pipeline or various devices may be mixed into the chemical liquid being supplied to the wafer, and a bubble may be generated in this chemical liquid. Further, in case of using a chemical liquid containing a resin material, for example, in case of using the resist, a polymer component larger than a normal polymer component, that is, a so-called abnormal polymer component may be included therein.

For example, if the particle, the bubble or the abnormal polymer is included in the resist, a defect in developing may be caused. In this regard, there is known a processing technique of monitoring these foreign substances and purifying the chemical liquid in a supply system including, for example, the pipeline until the amount of the foreign substances falls below a set value. As a way to monitor the foreign substances, there is known a method using a particle counter configured to irradiate a laser light to the chemical liquid within the flow path and measure the amount of the foreign substances by receiving scattered light from the foreign substances.

Meanwhile, as a design rule of the semiconductor device is getting miniaturized, an allowable particle size tends to become further smaller. Thus, there is a demand for a technique capable of detecting a more microscopic foreign substance with high accuracy. Since, however, the foreign substance as a detection target gets smaller, S (Signal level)/N (Noise level) is decreased, thus making it difficult to accomplish highly accurate detection. Further, if it is attempted to detect the abnormal polymer having a large size in the resist, an intensity of the laser light corresponding to the normal polymer having a small size becomes a noise, so that it is difficult to detect the abnormal polymer with high accuracy. By way of example, described in Patent Document 1 is a technique of detecting a particle contained in the chemical liquid by allowing a laser light to be transmitted through the flow path. However, it is further required to perform the detection with higher accuracy.

PRIOR ART DOCUMENT

Patent Document 1: Japanese Patent Laid-open Publication No. 2016-103590

DISCLOSURE OF THE INVENTION

Problems to be Solved by the Invention

Exemplary embodiments provide a technique capable of detecting a foreign substance flowing in a flow path with high accuracy.

Means for Solving the Problems

In one exemplary embodiment, a foreign substance detection device configured to detect a foreign substance in a fluid supplied to a target object includes a flow path unit configured to form a flow path through which the fluid supplied to the target object is flown; a laser light irradiator configured to irradiate a laser light into the flow path unit such that an optical path intersects with a flow direction of the fluid in the flow path unit; a light receiving element provided at the optical path having passed through the flow path unit; a detector configured to detect the foreign substance in the fluid based on a signal outputted from the light receiving element; and a filter unit provided at the optical path between the light receiving element and the flow path unit, and configured to block a Raman scattered light generated as the laser light is irradiated to the fluid from the laser light irradiator and allow a Rayleigh scattered light to be transmitted to the light receiving element.

In another exemplary embodiment, a foreign substance detection method of detecting a foreign substance in a fluid supplied to a target object includes supplying the fluid into a flow path unit configured to form a flow path through which the fluid supplied to the target object is flown; irradiating laser light into the flow path unit by a laser light irradiator such that an optical path intersects with a flow direction of the fluid in the flow path unit; receiving the laser light by a light receiving element provided at the optical path having passed through the flow path unit; detecting the foreign substance in the fluid by a detector based on a signal outputted from the light receiving element; and blocking a Raman scattered light generated as the laser light is irradiated to the fluid from the laser light irradiator and allowing a Rayleigh scattered light to be transmitted to the light receiving element by a filter unit provided at the optical path between the light receiving element and the flow path unit.

In still another exemplary embodiment, there is provided a computer-readable recording medium having stored thereon computer-executable instructions that, in response to execution, cause a foreign substance detection device, which is configured to detect a foreign substance in a fluid supplied onto a target object, to perform the foreign substance detection method.

Effect of the Invention

According to the exemplary embodiment, a flow path unit for detection, which is a part of a supply path of a fluid to be supplied onto a substrate and forms a detection region of a foreign substance contained in the fluid, and a light receiving element, which is configured to receive light irradiated from a light irradiator and transmitted through the flow path unit, are provided. Further, a filter unit configured to block a Raman scattered light generated as the light is irradiated to the fluid and allow a Rayleigh scattered light to be transmitted to the light receiving element is provided between the flow path unit and the light receiving element. Accordingly, the Raman scattered light can be suppressed from reaching the light receiving element, so that a noise in a signal outputted from the light receiving element can be suppressed from being generated. Thus, the foreign substance in the fluid can be detected with high accuracy.

DETAILED DESCRIPTION

Figure 1:
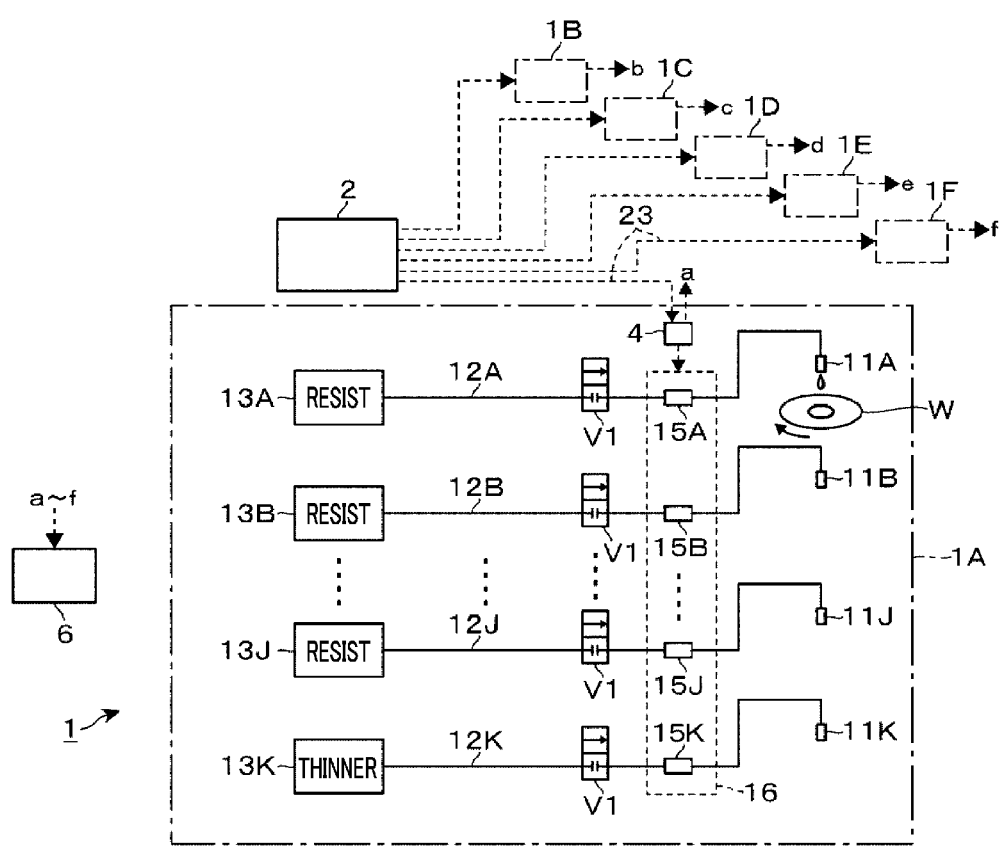
FIG. 1 is a schematic configuration view of a coating and developing apparatus according to an exemplary embodiment.

FIG. 1 is a schematic diagram of a coating and developing apparatus 1 to which a foreign substance detection device according to an exemplary embodiment is applied. This coating and developing apparatus 1 is equipped with; resist coating modules 1A and 1B; antireflection film forming modules 1C and 1D; and protective film forming modules 1E and 1F each of which is configured to perform a processing by supplying a chemical liquid to a substrate as a processing target object, for example, a wafer W. These modules 1A to 1F (the resist coating modules 1A and 1B, the antireflection film forming modules 1C and 1D, and the protective film forming modules 1E and 1F) are chemical liquid supply modules configured to supply chemical liquids to the wafer W and perform processings thereon. The coating and developing apparatus 1 performs formation of an antireflection film, formation of a resist film and formation of a protective film for protecting the resist film during exposure in sequence by supplying various kinds of chemical liquids to the wafer W from the modules 1A to 1F, and then, develops the wafer W after being subjected to the liquid immersion and the exposure.

Each of the aforementioned modules 1A to 1F is equipped with a supply path for a chemical liquid, and the coating and developing apparatus 1 is configured to detect a foreign substance in the chemical liquid flowing in this supply path. The chemical liquid flown in this supply path is supplied to the wafer W. The supply of the chemical liquid to the wafer W and the detection of the foreign substance are performed at the same time. Here, the foreign substance refers to, by way of non-limiting example, a particle, a bubble, an abnormal polymer having a larger particle size than a normal polymer constituting the chemical liquid, and so forth. The detection of the foreign substance specifically refers to detection of the total number of foreign substances flowing in a predetermined detection region within the supply path of the chemical liquid during a preset time period and a size of each foreign substance. The coating and developing apparatus 1 is equipped with a light supply 2, and the light supply 2 is configured to guide, through the fiber 23, laser light having a wavelength of, e.g., 532 nm, which is outputted from a light source (not shown), to a foreign substance detection unit 4 provided at each of the modules 1A to 1F.

The modules 1A to 1F have a substantially same configuration. Here, a schematic configuration of the resist coating module 1A shown in FIG. 1 will be explained. The resist coating module 1A is equipped with, by way of example, eleven nozzles 11A to 11K, and, among them, ten nozzles 11A to 11J are configured to discharge a resist as a chemical liquid onto the wafer W, thus allowing a resist film as a coating film to be formed. The nozzle 11K is configured to discharge a thinner onto the wafer W. The thinner is supplied onto the wafer W before the resist is supplied. The thinner is a chemical liquid for pre-wetting and serves to improve wettability of the resist. Further, the thinner is a solvent for the resist.

Downstream ends of chemical liquid supply lines 12A to 12J constituting supply paths of the chemical liquids are respectively connected to the nozzles 11A to 11J, and upstream ends of the chemical liquid supply lines 12A to 12J are respectively connected to resist supply sources 13A to 13J via valves V1. Each of the resist supply sources 13A to 13J is equipped with, by way of example, a bottle in which a resist is stored; and a pump configured to force-feed the resist supplied from the bottle to corresponding one of the nozzles 11A to 11J. The resists stored in the respective bottles of the resist supply sources 13A to 13J are all of different kinds, and one kind of resist selected from these ten kinds of resists is supplied to the wafer W.

The nozzle 11K is connected with a downstream end of a chemical liquid supply line 12K, and an upstream end of the chemical liquid supply line 12K is connected to a supply source 13K via a valve V1. The supply source 13K has the same configuration as the other supply sources 13A to 13J except that the thinner is stored therein instead of the resists. That is, in the processing of the wafer W, the timings when the chemical liquids flow in the chemical liquid supply lines 12A to 12K are all different. The chemical liquid supply lines 12A to 12K are made of a flexible material such as, but not limited to, resin and configured not to interfere with movements of the nozzles 11A to 11K to be described later. On the chemical liquid supply lines 12A to 12K, cuvettes 15A to 15K are provided between the nozzles 11A to 11K and the valves V1, respectively. Each of the cuvettes 15A to 15K is configured as a flow path unit for measurement of a foreign substance and the foreign substance flowing therein is detected. Details of the cuvettes 15A to 15K will be discussed later.

Figure 2:
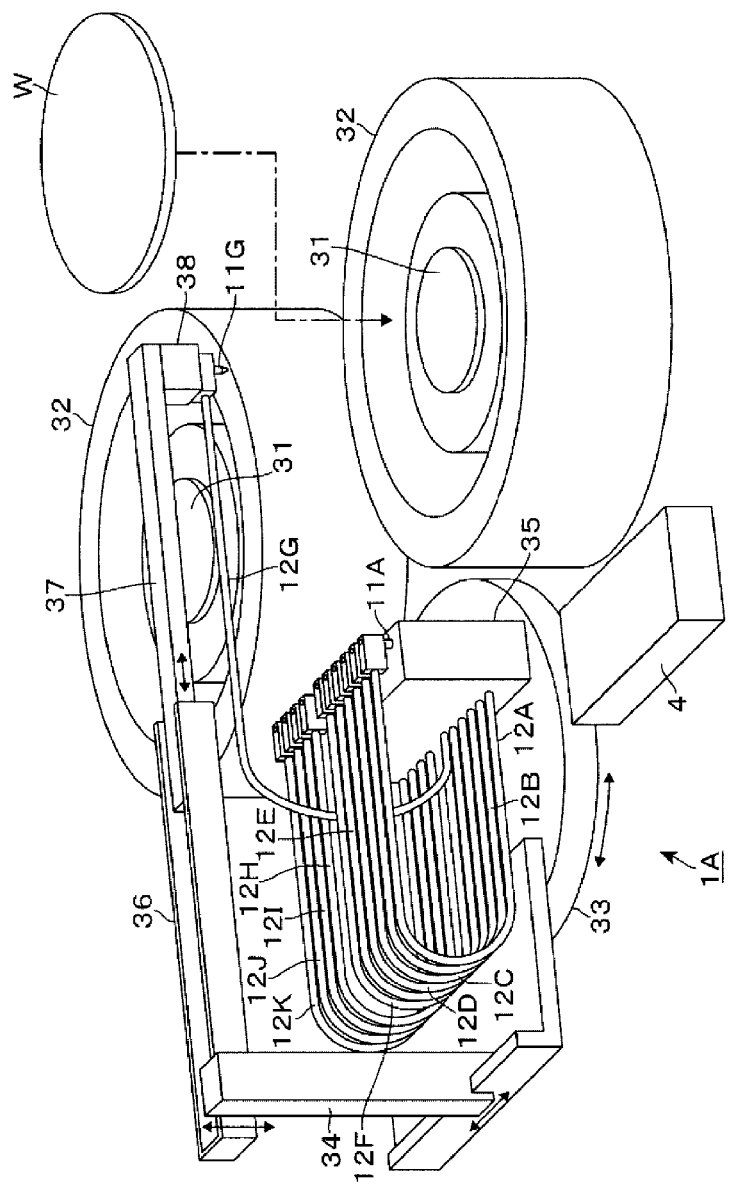
FIG. 2 is a perspective view of a resist coating module provided in the coating and developing apparatus.

FIG. 2 depicts an example of a further detailed configuration of the resist coating module 1A. In the drawing, reference numerals 31 denote spin chucks each of which is configured to attract and hold a central portion of a rear surface of the wafer W and rotate the held wafer W around a vertical axis. Further, in the drawing, reference numerals 32 denote recovery cups each of which is configured to surround, from below and from the side, the wafer W held by the corresponding spin chuck 31 to suppress scattering of the chemical liquids. In the drawing, a reference numeral 33 denotes a rotary stage configured to be pivotable around a vertical axis, and a horizontally movable vertical supporting column 34 and a holder 35 for the nozzles 11A to 11K are provided at the rotary stage 33. A reference numeral 36 denotes an elevating unit configured to be movable up and down along the supporting column 34, and a reference numeral 37 is an arm configured to be movable along the elevating unit 36 in a horizontal direction orthogonal to a moving direction of the supporting column 34. An attaching/detaching mechanism 38 for the nozzles 11A to 11K is provided at a leading end of the arm 37. The nozzles 11A to 11K are moved between a position above each spin chuck 31 and the holder 35 by cooperation between the rotary stage 33, the supporting column 34, the elevating unit 36 and the arm 37.

Figure 3:
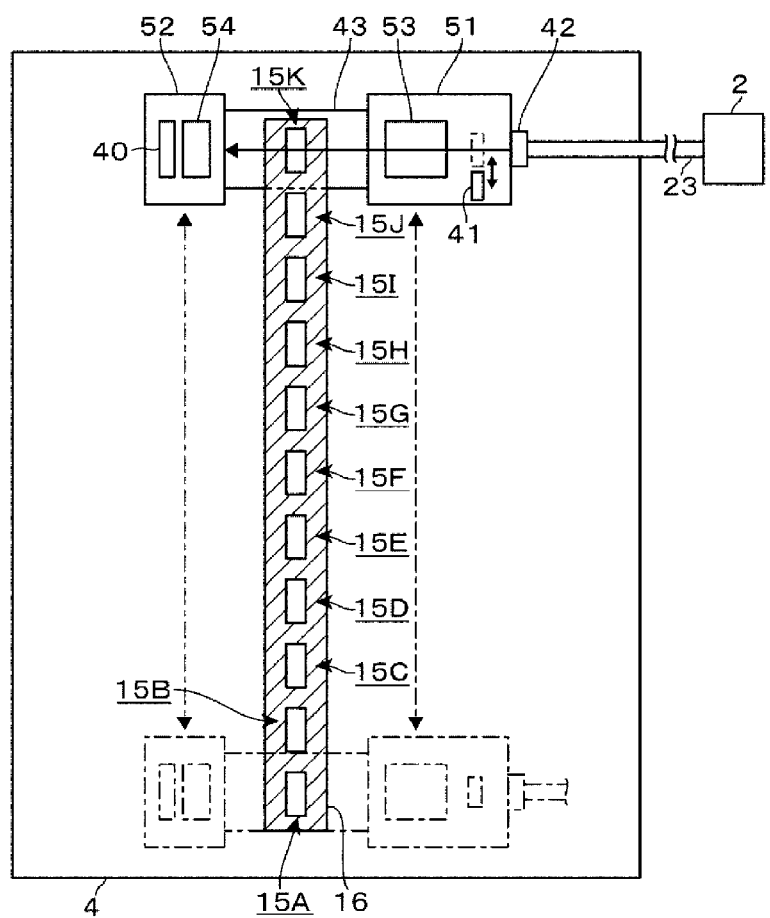
FIG. 3 is a schematic configuration view of a foreign substance detection unit provided in the coating and developing apparatus.

The foreign substance detection unit 4 is provided at a side of the aforementioned rotary stage 33 and the recovery cup 32 so as not to interfere with movements of the arm 37 and the supporting column 34. This foreign substance detection unit 4, the aforementioned light supply 2 and a controller 6 to be described later constitute a foreign substance detection device according to the exemplary embodiment. FIG. 3 is a plan view of the foreign substance detection unit 4. The foreign substance detection unit 4 includes a laser light irradiator 51, a light receiver 52 and a flow path array 16, and is configured as a light scattering type particle counter using a forward scattered light, for example. That is, when a light receiving element receives a scattered light generated by a foreign substance, detection of the foreign substance is performed based on a variation of signals outputted from the light receiving element.

A downstream end of the aforementioned fiber 23 is connected to the laser light irradiator 51 via a collimator 42. By way of example, while the coating and developing apparatus 1 is being operated, the light is constantly supplied to the fiber 23 from the light supply 2, and a state in which the light is supplied to the flow path array 16 and a state in which the supply of the light to the flow path array 16 is stopped is switched by opening or closing an optical path with shutter 41 to be described later. The fiber 23 has flexibility so as not to disturb a movement of the laser light irradiator 51 to be described later.

Figure 4:
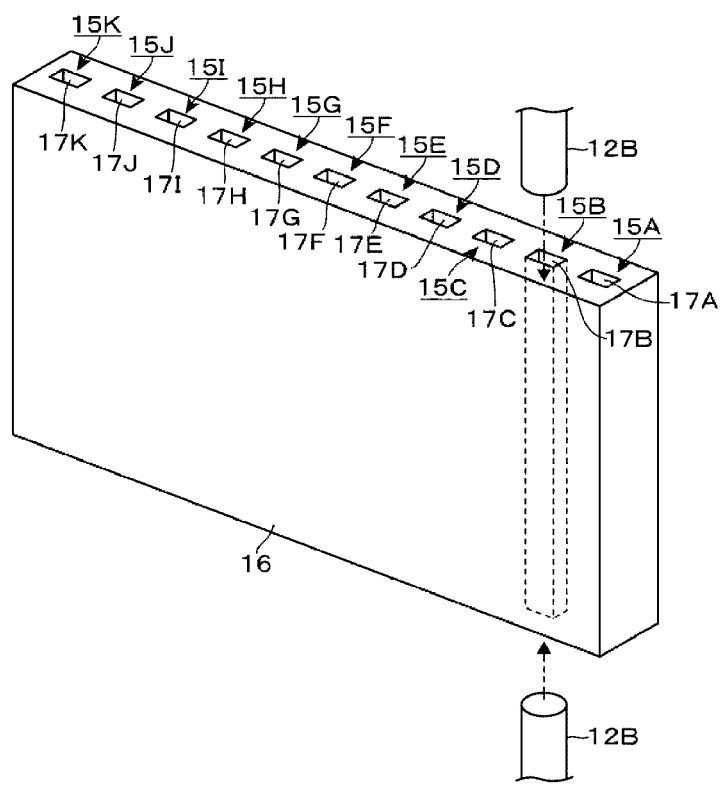
FIG. 4 is a perspective view of a member constituting flow paths for chemical liquids, which constitutes the foreign substance detection unit.

The flow path array 16 will be explained with reference to a perspective view of FIG. 4. The flow path array 16 constituting a flow path unit for the chemical liquids is made of quartz, and is configured as a transversally elongated rectangular block and provided with eleven through holes formed in the vertical direction. These through holes are arranged along the lengthwise direction of the flow path array 16, and the respective through holes and wall portions around the through holes are configured as the aforementioned cuvettes 15A to 15K, respectively. Accordingly, the cuvettes 15A to 15K are configured as uprightly standing tubes, and the chemical liquids flow downwards in the respective through holes constituting the cuvettes 15A to 15K. The through holes of the cuvettes 15A to 15K are referred to as flow paths 17A to 17K. The flow paths 17A to 17K have the same configuration and are provided via the chemical liquid supply lines 12A to 12K, respectively, as described above.

Referring back to FIG. 3, the laser light irradiator 51 and the light receiver 52 are disposed to face each other with the flow path array 16 therebetween in the forward-backward direction. A reference numeral 43 is a stage configured to support the laser light irradiator 51 and the light receiver 52 from below the flow path array 16 and configured to be movable in the left-right direction by a non-illustrating moving mechanism. As the stage 43 is moved, the laser light irradiator 51 is capable of irradiating the light guided from the fiber 23 to one of the flow path 17 selected from the flow paths 17A to 17K, and the light receiver 52 receives the light irradiated to and having passed through the flow path 17. That is, an optical path is formed in the flow path 17 to intersect with a flow direction of the chemical liquid therein.

Figure 5:
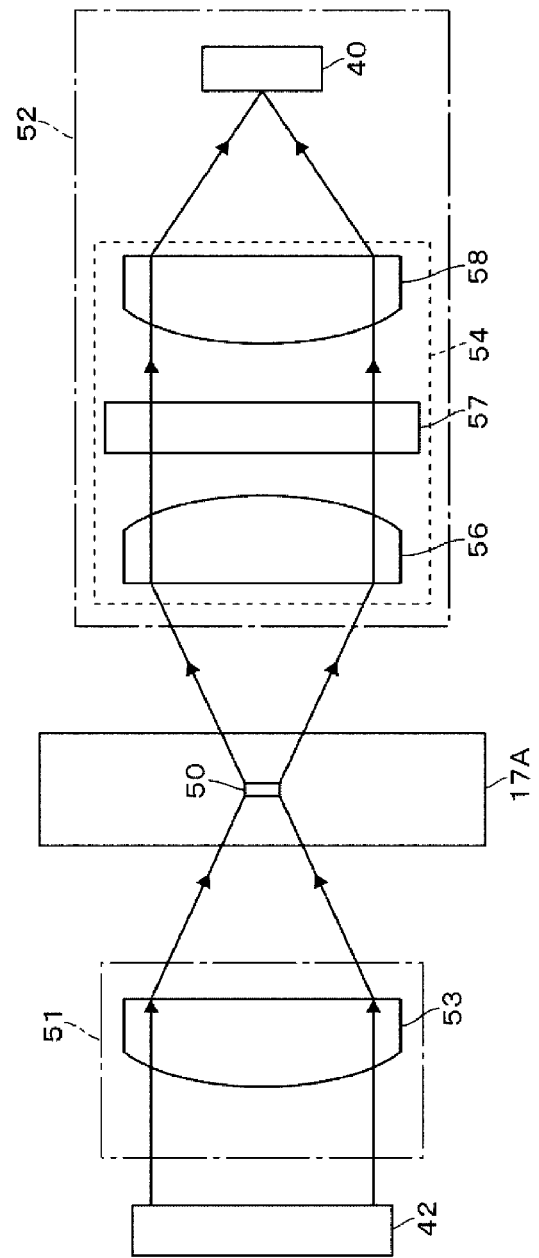
FIG. 5 is a plan view of the foreign substance detection unit.

FIG. 5 is a schematic configuration view of the laser light irradiator 51 and the light receiver 52. FIG. 5 illustrates a state in which light is irradiated to the flow path 17A among the flow paths 17A to 17K, and arrows in the drawing schematically indicate the aforementioned optical path formed by the laser light. For the convenience of explanation, a direction oriented from the laser light irradiator 51 toward the light receiver 52 is defined as a rear side. The laser light irradiator 51 is equipped with an optical system, and this optical system includes, by way of non-limiting example, a condensing lens 53. Further, though not shown in FIG. 5, the laser light irradiator 51 is equipped with the aforementioned shutter 41 as shown in FIG. 3.

The aforementioned collimator 42 is configured to irradiate the laser light toward the rear side in the horizontal direction. The shutter 41 is configured to open/close the optical path by being moved between a blocking position (indicated by a dashed line in FIG. 3) where it closes the optical path between the collimator 42 and the condensing lens 53 and an opening position (indicated by a solid line in FIG. 3) where it is retreated from the optical path. The condensing lens 53 is composed of a cylindrical lens or a lens called a laser line generator lens or a Powell lens. As depicted in FIG. 5, the condensing lens 53 is configured to concentrate the laser light irradiated from the collimator 42 to the flow path 17A and flatten the laser light such that a length in a direction orthogonal to the flow direction of the chemical liquid is longer than a length in the flow direction of the chemical liquid with respect to a transversal cross section of the optical path. This transversal cross section (cross section seen in the forward-backward direction) of the optical path is of, for example, a circular shape at a front side of the condensing lens 53, and the transversal cross section of the optical path within the cuvette 15 is of, for example, an oval shape having a longer diameter in the left-right direction by the condensing lens 53.

In the optical path formed in the flow path 17A, a condensing region having a relatively high energy density is a detection region 50 of a foreign substance, and the foreign substance, which has entered the detection region 50, is detected. Since the optical path is formed in the flow path 17A as stated above, this detection region 50 is transversally elongated in the left-right direction, and a ratio of an area of the detection region 50 to an area of the flow path 17A is relatively large when viewed from the top. By forming this detection region 50, a ratio of a detected number of the foreign substances to a total number of the foreign substances flowing in the flow path 17A is increased.

Now, the light receiver 52 will be explained. The light receiver 52 is equipped with an optical system 54 and a light detector 40. The optical system 54 is provided at the front side, and the light detector 40 is disposed at the rear side. The optical system 54 includes, by way of example, an objective lens 56, a band pass filter 57 and an imaging lens 58 arranged in this sequence from the front side toward the rear side. The light having passed through the cuvette 15A becomes a parallel light by the objective lens 56 to pass through the band pass filter 57 as a filter unit, and then, is concentrated to the light detector 40 by the imaging lens 58. The light detector 40, which will be described in detail later, is composed of a light receiving element. Since an operation of the band pass filter 57 is dependent on an incident angle, it is provided at a position where the parallel light reaches as stated above. Further, although the optical path formed when the light is irradiated to the flow path 17A has been described so far, an optical path is formed in the same way when the light is irradiated to any of the other flow paths 17B to 17K.

Now, a function of the aforementioned band pass filter 57 will be explained with reference to a schematic diagram of FIG. 6. A resist flowing in the flow paths 17A to 17J includes a multiple number of polymers 61 for forming a resist film on the wafer W. Each polymer 61 is a polymer which is normally included in the resist and does not cause agglomeration or the like. If the light irradiated to the resist flowing in the flow path 17A from the laser light irradiator 51 is irradiated to the polymer 61, a Stokes light and an anti-Stokes light by Raman scattering and a Rayleigh light by Rayleigh scattering are generated. The Rayleigh light is a light having a wavelength of 523 nm, the same as the light before being irradiated to the polymer 61. The Stokes light has a wavelength shifted to a longer wavelength than 532 nm, and the anti-Stokes light has a wavelength shifted to a shorter wavelength than 532 nm. Accordingly, the wavelength component of the laser light after passing through the flow paths 17A to 17J includes a wavelength shift component besides the wavelength of the light source. Likewise, if the laser light is irradiated to a foreign substance 62, the Stokes light and the anti-Stokes light, which are caused by the Raman scattered lights, and the Rayleigh light are generated. Further, even in case that the laser light is irradiated to a component of the resist other than the polymer 61, for example, a thinner as a solvent for the resist, the Rayleigh light, the Stokes light and the anti-Stokes light are generated.

Detection of the foreign substance is performed based on a variation of the light reception in the light receiving element of the light detector 40 when the laser light is irradiated to the foreign substance 62. Besides the scattered lights (the Rayleigh light, the Stokes light and the anti-Stokes light) generated from the foreign substance 62, however, the scattered lights generated from the normal polymer 61 and the scattered lights generated from the thinner are also irradiated to the light receiving element. If, however, the scattered lights from the polymer 61 and a component (such as the thinner) of the resist other than the polymer 61 are irradiated to the light receiving element, a voltage signal outputted from the light detector 40 is found to have an amplitude caused by these scattered lights. That is, the voltage signal becomes a background noise. If an amplitude of a foreign substance detection signal is smaller than that of the background noise signal, it may be difficult to distinguish the foreign substance detection signal and the noise signal. That is, a level of this noise signal determines a minimum particle diameter of the foreign substance which can be measured (minimum measurable particle diameter).

Figure 7:
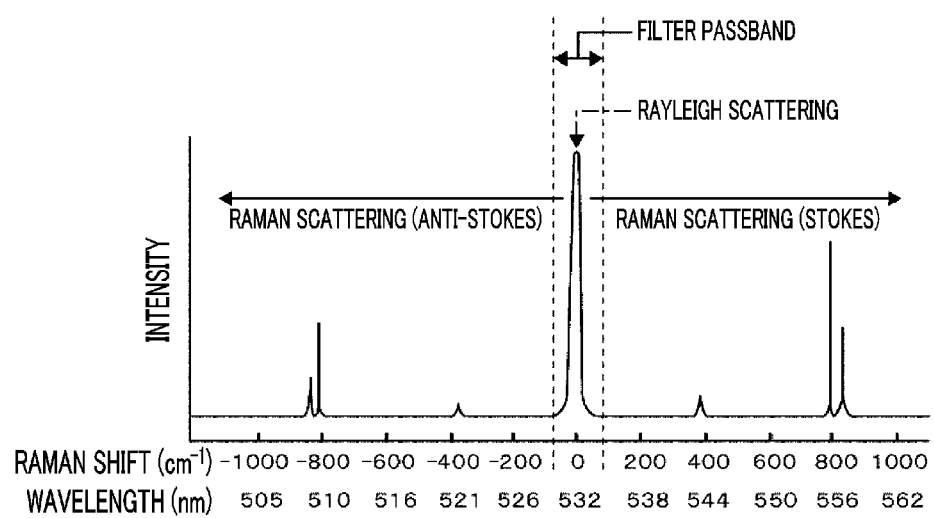
FIG. 7 is a graph showing a characteristic of the band pass filter.

FIG. 7 is a graph showing a schematic diagram of a Raman spectrum of a light guided to the light detector 40 in a configuration where the band pass filter 57 is not provided. A horizontal axis of the graph represents a Raman shift (unit: $cm^{-1}$), that is, a wavelength of light (unit: nm), and a vertical axis of the graph indicates a Raman intensity. On the spectrum, a relatively large peak observed at a wavelength near +800 $cm^{-1}$ is caused by the Stokes lights for contaminant, that is, the polymer 61 and the component (including the thinner) of the resist other than the polymer 61, which is not the foreign substance. Further, a relatively large peak observed at a wavelength near −800 $cm^{-1}$ is caused by the anti-Stokes light for the corresponding contaminant. The component having the relatively large peak may cause a relatively high-level noise.

Figure 6:
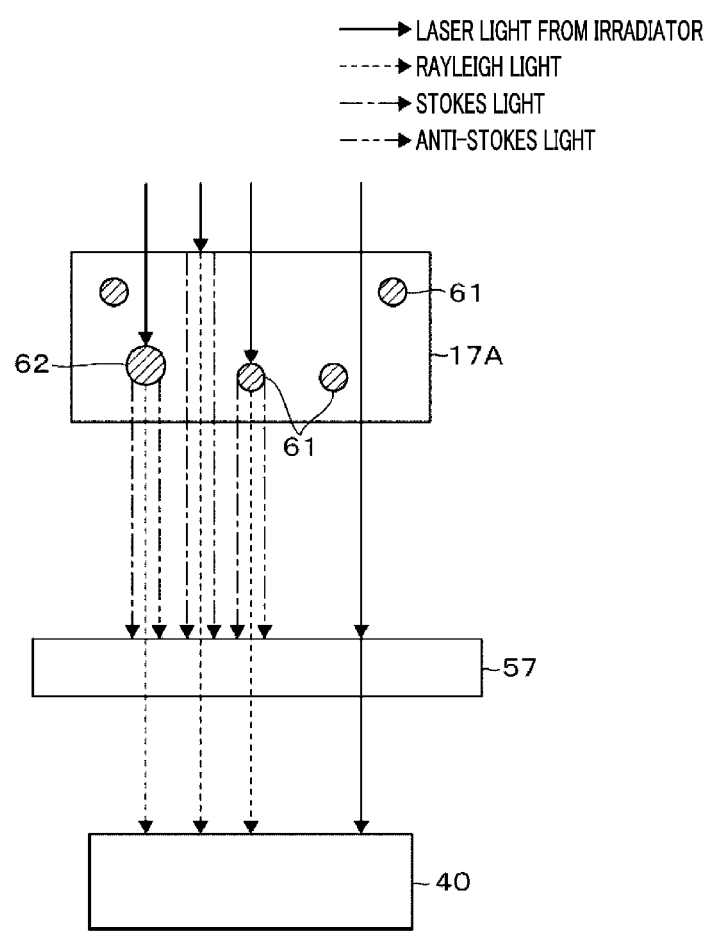
FIG. 6 is a schematic diagram for describing an operation of a band pass filter provided in the foreign substance detection unit.

Thus, by providing the band pass filter 57, as shown in FIG. 6, the components of the Stokes light and the anti-Stokes light by the contaminant are removed, and the Rayleigh lights generated from the foreign substance 62, the polymer 61 and the component (such as the thinner) of the resist other than the polymer 61 are guided to the light detector 40 including the light receiving element. That is, among the scattered lights from the polymer 61 and the thinner, which cause the aforementioned noise, the Stokes light and the anti-Stokes light by the polymer 61 and the Stokes light and the anti-Stokes light by the thinner can be removed by the band pass filter 57. This band pass filter 57 is configured to have a half value width of 4 nm to have such a function. Further, if not particularly mentioned, the half value width of the present disclosure is regarded as a full width at half maximum. Furthermore, a central wavelength of the band pass filter 57 is 532 nm, which is the wavelength of the laser light outputted from the light supply 2 in the present exemplary embodiment.

Figure 8:
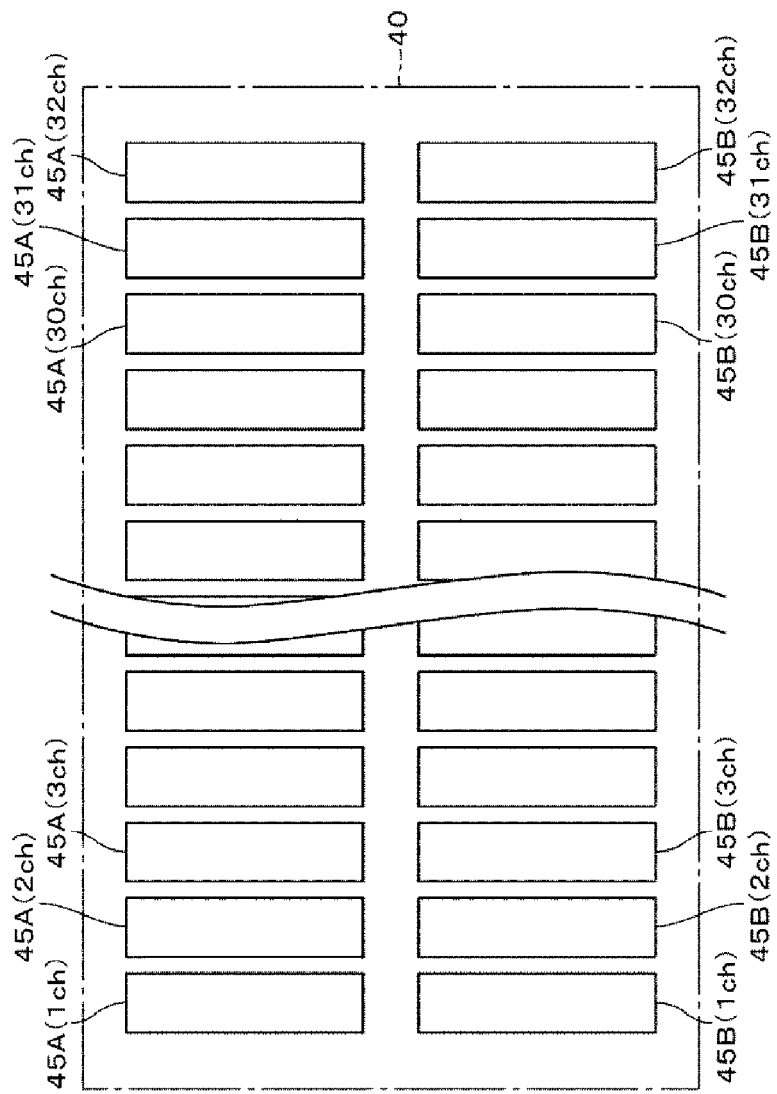
FIG. 8 is a plan view of a light detector constituting the foreign substance detection unit.

Now, the light detector 40 will be discussed with reference to a plan view of FIG. 8. The light detector 40 is composed of, for example, sixty four light receiving elements each of which is implemented by, but not limited to, a photodiode. These light receiving elements are arranged at a regular interval therebetween to form a matrix of, e.g., 2×32. The light receiving elements arranged at an upper side are referred to as light receiving elements 45A and the light receiving elements arranged at a lower side are referred to as light receiving elements 45B. Each light receiving element 45A and each light receiving element 45B provided at each same position in the left-right direction constitute each single set. These sets of the light receiving elements 45A and 45B may be assigned channel numbers 1ch to 32ch in sequence from the left side when viewed toward the rear side.

Figure 9:
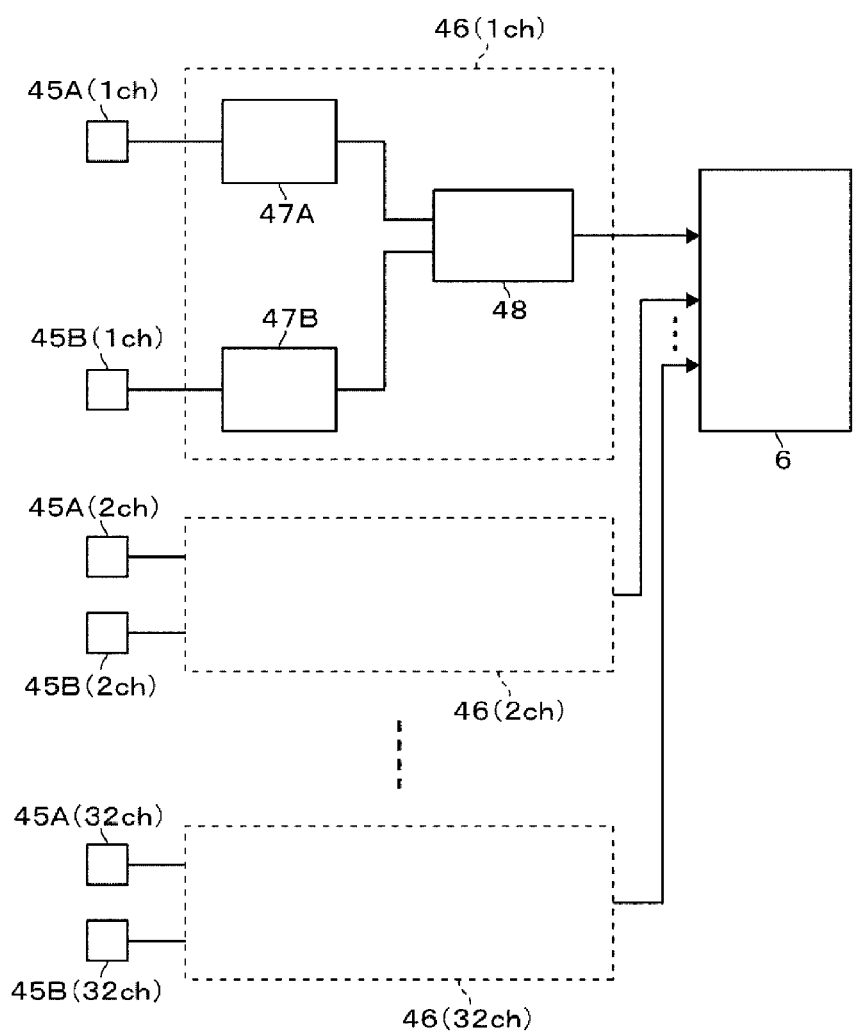
FIG. 9 is a block diagram illustrating a circuit configuration provided in the foreign substance detection unit.

The foreign substance detection unit 4 is equipped with a total number of thirty two circuit units 46 configured to correspond to the respective channels of the light receiving elements 45A and 45B. Referring to FIG. 9, these circuit units 46 will be explained. Each circuit unit 46 is equipped with transimpedance amplifiers (TIA) 47A and 47B provided at rear ends of the light receiving elements 45A and 45B, respectively; and a differential circuit 48 provided at the rear end of the TIA 47A and 47B. The light receiving elements 45A and 45B supply electric currents according to intensities of the received lights to the TIA 47A and 47B, and the TIA 47A and 47B output voltage signals corresponding to the supplied electric currents to the differential circuit 48. The differential circuit 48 outputs a differential voltage signal between the voltage signal from the TIA 47A and the voltage signal from the TIA 47B to the controller 6 to be described later.

The controller 6 performs detection of the foreign substance based on the signal output from the differential circuit 48. Here, the detection of the foreign substance is performed based on the signal corresponding to the difference between the outputs from the light receiving elements 45A and 45B in order to remove a noise commonly detected by the light receiving elements 45A and 45B. Further, the aforementioned circuit units 46 may also be assigned same channel numbers as the channel numbers of their corresponding light receiving elements 45A and 45B connected thereto.

Figure 10:
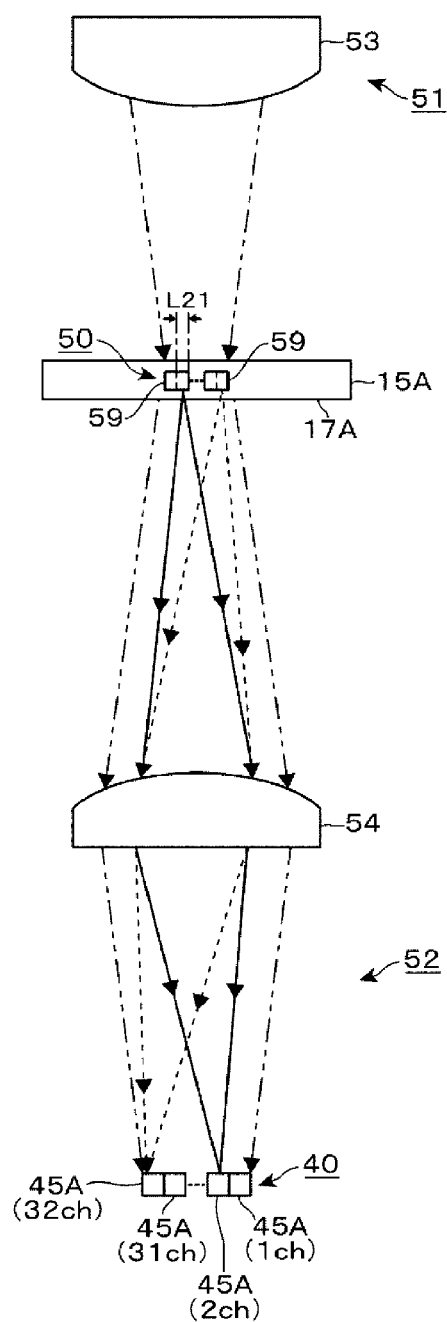
FIG. 10 is a schematic diagram illustrating an optical path in the foreign substance detection unit.

A relationship between the light receiving elements 45A (45B) and the aforementioned detection region 50 of the cuvette will be described in further detail with reference to a schematic diagram of FIG. 10. A dashed double-dotted arrow in the drawing indicates the optical path ranging from the laser light irradiator 51 to the light receiving elements 45A when the laser light is irradiated toward the flow path 17A of the cuvette 15A. In the optical path within the flow path 17A, when view in the direction toward the front side, split detection regions, which are obtained by dividing an upper-half of the detection region 50 as the light condensing region in thirty two (32) regions in the lengthwise direction thereof, will be referred to as a split detection region of 1ch to a split detection region of 32ch in sequence from the right end. In FIG. 10, a width L21 of each split detection region in the left-right direction is, e.g., 0.85 µm, and each split detection region is assigned a reference numeral 59.

The optical system 54 is configured such that: the split detection region 59 of the 1ch and the light receiving element 45A of the 1ch are in one-to-one correspondence; the split detection region 59 of the 2ch and the light receiving element 45A of the 2ch are in one-to-one correspondence; the split detection region 59 of the 3ch and the light receiving element 45A of the 3ch are in one-to-one correspondence; and, likewise, the rest of the split detection regions 59 and the light receiving elements 45A of the same channels are in one-to-one correspondence in sequence. That is, a substantially all of reaction light (light perturbed by a reaction) generated as the light reacts with the foreign substance in the split detection region 59 of the 1ch is irradiated to the light receiving element 45A of the 1ch, and substantially all of reaction light (light perturbed by a reaction) generated as the light reacts with the foreign substance in the split detection region 59 of the 2ch is irradiated to the light receiving element 45A of the 2ch. In FIG. 10, solid arrows and dashed arrows indicate optical paths of the reaction lights irradiated from the split detection regions 59 of different channels to the light receiving elements 45A of the different channels.

Since the light is irradiated in this way, a signal corresponding to the foreign substance which has entered the detection region 50 is outputted from the light receiving element 45A of a single channel. By way of example, if this reaction light is not irradiated only to the light receiving element 45A of the corresponding channel but is also irradiated to the light receiving element 45A of another channel, a level of an electric current flowing in the light receiving element 45A is lowered, so that the detection accuracy is lowered. That is, by adopting the above-described configuration in which the split detection regions and the light receiving elements 45A are in the one-to-one correspondence, the detection accuracy for the foreign substance is improved.

Likewise, if split detection regions 59, which are obtained by dividing a lower-half of the detection region 50 as the light condensing region in thirty two (32) regions in the lengthwise direction thereof, are referred to as a split detection region 59 of 1ch to a split detection region 59 of 32ch in sequence, the split detection region 59 of each specific channel corresponds to the light receiving element 45B of the corresponding specific channel. That is, the optical system 54 is configured such that the reaction light of the split detection region 59 of each specific channel is irradiated to the light receiving element 45B of the corresponding specific channel.

Moreover, the multiple channels of the light receiving elements 45A and 45B are provided as stated above to suppress the energy of the laser light received by each light receiving element 45 (45A, 45B) to thereby reduce a shot noise caused by shaking of photons of the laser light, thus improving the SN ratio (S/N). Further, the multiple channels of the light receiving elements 45A and 45B are provided to suppress the number of normal polymers flowing in the detection region corresponding to each light receiving element 45 to thereby suppress a noise that might be caused by the corresponding polymers, thus improving the S/N ratio. Here, although the description has been provided for the optical path formed when the detection region 50 is provided in the cuvette 15A, an optical path is formed in the same way as described above when the detection region 50 is formed in any of the other cuvettes 15B to 15K, and the detection of the foreign substance is carried out.

Now, the controller 6 (see FIG. 1 and FIG. 9) as a foreign substance detector provided in the coating/developing apparatus 1 will be described. The controller 6 is implemented by, for example, a computer and equipped with a non-illustrated program storage. This program storage stores therein a program in which commands (process groups) are recorded to allow various operations such as processings on the wafer W in the respective modules, the above-described detection of the foreign substances based on the signals outputted from the respective channels of the light receiving elements, and a transfer of the wafer W within the coating and developing apparatus 1 by a transfer mechanism to be described later to be performed. As control signals are outputted to the individual components of the coating and developing apparatus 1 from the controller 6 according to the corresponding program, the aforementioned various operations are performed. This program is stored in the program storage while being recorded in a recording medium such as a hard disk, a compact disk, a magnet-optical disk, or a memory card.

The other modules besides the resist coating module 1A shown in FIG. 1 will be briefly explained. The resist coating module 1B has the same configuration as the resist coating module 1A. The antireflection film forming modules 1C and 1D and the protective film forming modules 1E and 1F have the same configuration as that of the resist coating modules 1A and 1B except that a chemical liquid for forming an antireflection film and a chemical liquid for forming a protective film are supplied instead of the resist and the thinner. The chemical liquid for forming the antireflection film contains polymers, the same as the resist. By way of example, the same as in the resist coating modules 1A and 1B, the chemical liquids are supplied to the wafer W in the modules 1C to 1F (the antireflection film forming modules 1C and 1D and the protective film forming modules 1E and 1F) as well.

Now, the processing upon the wafer W and the detection of the foreign substance performed in the aforementioned resist coating module 1A will be explained with reference to a timing chart of FIG. 11. This timing chart shows a timing when a pressure of the pump in one supply source 13 among the supply sources 13A to 13K is set; a timing when one nozzle 11, corresponding to the one supply source 13, among the nozzles 11A to 11K is moved by the arm 37; a timing when the valve V1 of the chemical liquid supply line 12, corresponding to the one supply source 13, among the chemical liquid supply lines 12A to 12K is opened/closed; a timing when the state in which the laser light is irradiated from the laser light irradiator 51 and the state in which the irradiation of the corresponding laser light is stopped is switched; and a timing when the signals from the respective channels of the light detector 40 is acquired by the controller 6. The timing when the state in which the laser light is irradiated and the state in which the irradiation is stopped is switched may also be referred to as a timing when the shutter 41 of the foreign substance detection unit 4 is opened/closed.

Actually, the coating of the thinner and the coating of the resist are performed on the wafer W in this order. Here, however, an operation from the coating of the resist will be explained for the convenience of explanation. First, after the wafer W is transferred to and held by the spin chuck 31, the nozzle 11A, for example, is moved to above the wafer W. Further, the pump of the supply source 13A performs pumping of the resist, so that setting of acquiring a preset pressure is begun (time t1). Concurrently with this movement of the nozzle and the operation of the pump, the laser light irradiator 51 and the light receiver 52 are moved to positions where they face each other with the cuvette 15A therebetween. At this time, the shutter 41 of the foreign substance detection unit 4 is closed.

The nozzle 11A is stopped above the wafer W (time t2), and the wafer W is rotated at a preset rotation number. Then, the valve V1 of the chemical liquid supply line 12A is opened, so that the resist is force-fed from the pump toward the nozzle 11A at a preset flow rate. Further, the shutter 41 is opened, and the laser light is irradiated from the laser light irradiator 51 to pass through the cuvette 15A. That is, the detection region 50 by the optical path as described in FIG. 5 and FIG. 10 is formed in the flow path 17A of the cuvette 15A (time t3). As described in FIG. 6, the Stokes lights and the anti-Stokes light, which are generated as the light is irradiated to the components of the resist such as the polymers 61, are blocked by the band pass filter 57, and the light having the wavelength of 532 nm and thereabout is selectively irradiated to the light receiver 52, and the signals are outputted from the light receiving elements 45A and 45B of each channel. Since the Stokes lights and the anti-Stokes lights are blocked, the noises contained in the signals outputted from the light receiving elements 45A and 45B to the circuit unit 46 are small.

The force-fed resist passes through the cuvette 15A to be discharged from the nozzle 11A onto the central portion of the wafer W. If the degree of openness of the valve V1 is increased to reach a predetermined degree of openness, the increase of the degree of openness of the valve V1 is stopped (time t4). Thereafter, the acquisition of the output signal from the circuit unit 46 of each channel by the controller 6 is begun (time t5). If the foreign substance flows downwards in the detection region 50 of the flow path 17A and the laser light is irradiated to the foreign substance, the generated scattered light is irradiated to the light receiving element 45A or 45B of the channel corresponding to the position where the foreign substance flows, and the signal corresponding to this foreign substance is outputted from the corresponding light receiving element 45A or 45B, so that the level of the output signal from the circuit unit 46 is changed. Thereafter, the acquisition of the output signal from the light receiving element 45 of each channel by the controller 6 is stopped (time t6). Then, the shutter 41 is closed, so that the irradiation of the laser light from the laser light irradiator 51 is stopped. Further, the valve V1 of the chemical liquid supply line 12A is closed (time t7), so that the discharge of the resist onto the wafer W is stopped. Then, the discharged resist is spread toward the peripheral portion of the wafer W by a centrifugal force, so that the resist film is formed.

Between the times t5 and t6, the foreign substances are counted for each channel of the light receiving elements based on the output signal obtained from the circuit unit 46 of each channel. Further, a particle diameter of the foreign substance is measured based on the output signal, and classification of the foreign substances is carried out. That is, the number of the foreign substances is counted for each of multiple ranges set for the particle diameters. The level of the noise included in this output signal is suppressed by the aforementioned band pass filter 57. That is, the S/N ratio of the output signal is relatively large. Accordingly, the counting of the foreign substances and the measurement of the particle diameter are performed with high accuracy. The numbers of the foreign substances detected in the respective channels are summed up, and the number of the foreign substances detected in the entire detection region 50 (that is, the total number of the foreign substances) is calculated. Thereafter, it is determined whether the total number of the foreign substances is equal to or larger than a threshold value, and it is also determined whether the number of foreign substances having the particle diameter larger than a predetermined size is equal to or larger than a threshold value.

If it is determined that the total number of the foreign substances is equal to or larger than the threshold value or if it is determined that the number of the foreign substances having the particle diameter larger than the preset size is equal to or larger than the threshold value, an alarm is outputted; the operation of the module 1A is stopped; and the processing on the wafer W is stopped. This alarm may be in the form of, by way of example, a preset display on a monitor constituting the controller 6 or an output of a preset sound from a speaker constituting the controller 6. The output of this alarm includes an output of a display or a sound for informing a user of the cuvette 15, among the cuvettes 15A to 15K, abnormality of which is detected. If it is determined that the total number of the foreign substances is not equal to or larger than the threshold value and that the number of the foreign substances having the particle diameter larger than the preset size is not equal to or larger than the threshold value, the output of the alarm is not performed, and the operation of the module 1A is not stopped. Further, the above-stated operations and determinations are performed by the controller 6 which constitutes a counting unit.

Figure 11:
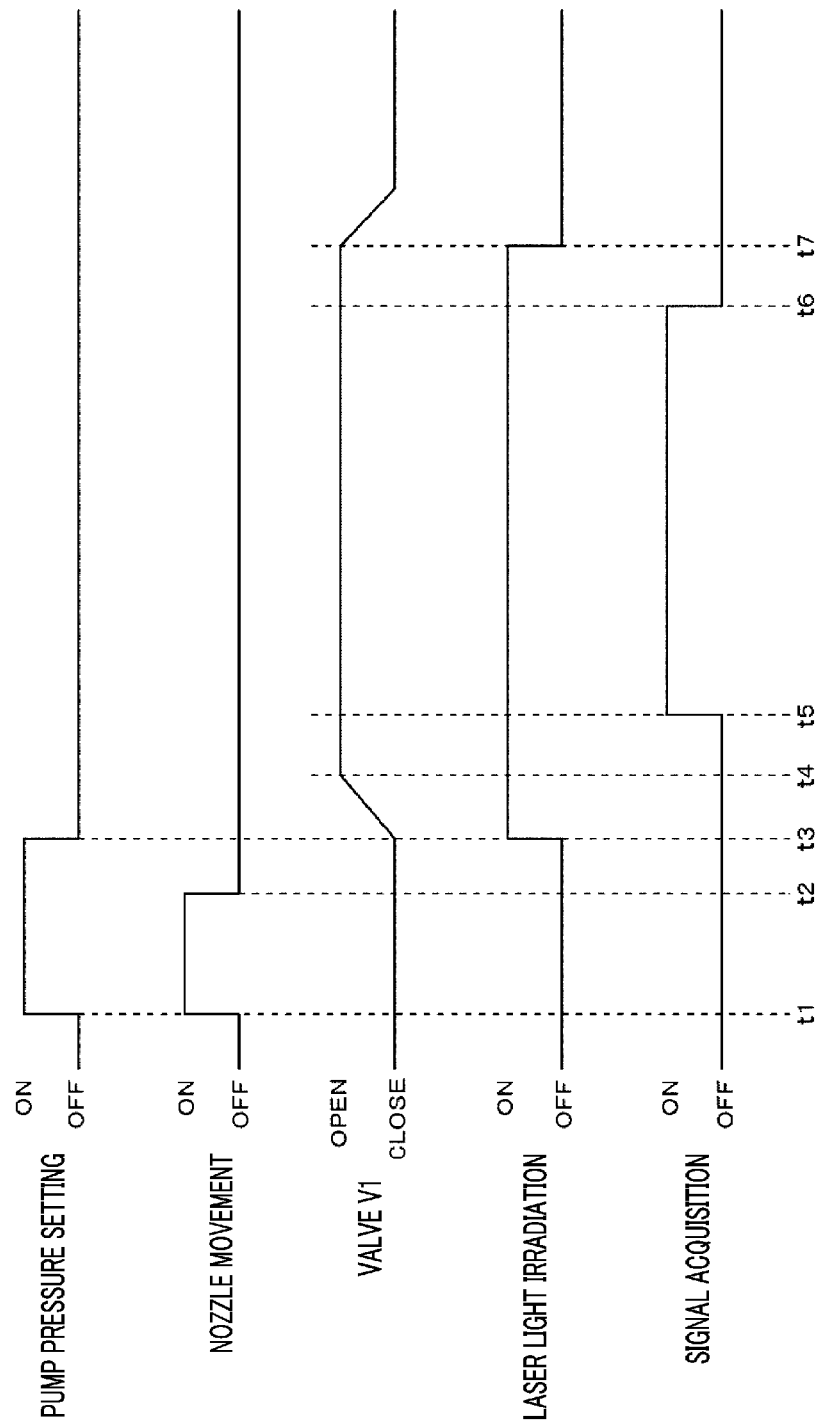
FIG. 11 is a timing chart showing operations of individual components of the coating and developing apparatus.

When discharging the thinner onto the wafer W, the respective components are operated according to the timing chart of FIG. 11 except that: the nozzle 11K is moved to above the wafer W instead of the nozzle 11A; the pump of the supply source 13K is operated instead of the pump of the supply source 13A; the valve V1 of the chemical liquid supply line 12K is opened/closed instead of the valve V1 of the chemical liquid supply line 12A; and the light is irradiated to the cuvette 15K instead of the cuvette 15A. By these operations, the supply of the thinner onto the wafer W and the detection of the foreign substances in the thinner are carried out in parallel.

Although the thinner does not contain the polymer 61, the Raman scattered light is generated as the laser light is irradiated to the thinner, and the band pass filter 57 is capable of blocking this Raman scattered light. Accordingly, the same as in case of detecting the foreign substances in the resist, the detection of the foreign substances is performed with high accuracy. Like the resist, the thinner supplied onto the wafer W is spread onto the entire surface of the wafer W by the rotation of the wafer W. The resist, which is supplied through the aforementioned flow path 17A, is supplied onto the wafer W on which the thinner is supplied as stated above.

In case that the resist included in the chemical liquid supply sources except the supply source 13A is supplied onto the wafer W after the supply of the thinner to the wafer W, the same operations as in case of supplying the resist from the supply source 13A onto the wafer W are performed except that a nozzle configured to discharge a target resist is moved to above the wafer W, the pump of the supply source corresponding to the target resist is operated, the valve V1 of the supply line corresponding to the target resist is opened/closed, and the laser light is irradiated to the cuvette corresponding to the target resist.

In the detection of the foreign substances described in the chart of FIG. 11, to improve the detection accuracy by performing the detection of the foreign substances in the state that the liquid flow of the cuvette 15A is stabilized, the timing when the valve V1 is opened/closed and the timing when the acquisition of the output signal by the controller 6 is begun (stopped) are deviated. By way of example, a period between the times t4 and t5 is in the range from 10 milliseconds to 1000 milliseconds, and a period between the times t6 and t7 ranges from 10 milliseconds to 100 milliseconds. In the above, though the operation of the module 1A has been described, for example, the supply of the chemical liquids upon the wafer W and the detection of the foreign substances in the other modules 1B to 1F are performed in the same manner as in the module 1A.

According to this coating and developing apparatus 1, the cuvettes 15A to 15K, each of which serves as a part of the flow path of the chemical liquid to be supplied onto the wafer W and each of which constitutes the detection region for the foreign substances contained in the chemical liquid, and the light detector 40, which is configured to receive the light transmitting through the cuvettes 15A to 15K after being irradiated from the laser light irradiator 51, are provided. Further, the band pass filter 57 configured to block the Raman scattered light generated as the laser light is irradiated to the chemical liquid while allowing the Rayleigh scattered light to pass therethrough to be sent to the light detector 40 is provided at the rear end of the cuvettes 15A to 15K. Accordingly, the Stokes light and the anti-Stokes light, which are Raman scattered lights, can be suppressed from reaching the light detector 40 and becoming the noise of the signal outputted from the light detector 40. Thus, the S/N ratio of the output signal from the light detector 40 can be increased, so that the detection of the foreign substances in the chemical liquid can be carried out with high accuracy.

Further, by performing the detection of the foreign substance as stated above, cleanness of the chemical liquid supplied to the wafer W is monitored. When the cleanness of the chemical liquid declines below a preset reference, the operation of the module is stopped as stated above, and the processing on a next wafer W is stopped in the corresponding module. Thus, the chemical liquid having low cleanness can be suppressed from being supplied to the next wafer W, so that the decrease of the yield can be avoided. Further, since the chemical liquid supply line 12 from which the foreign substance is detected is specified among the chemical liquid supply lines 12A to 12K, the user of the coating and developing apparatus 1 can perform maintenance or repair promptly after the operation of the module is stopped. Therefore, lengthening of a time period during which the module is stopped can be suppressed, so that the deterioration of the productivity of the semiconductor products in the coating and developing apparatus 1 can be suppressed.

Further, if it is determined that the total number of the foreign substances flowing in the detection region 50 is equal to or larger than the threshold value or if it is determined that the number of the foreign substances having the particle diameter larger than the preset size is equal to or larger than the threshold value as described above, the countermeasure may not be limited to outputting the alarm or stopping the operation of the corresponding module. By way of example, from the chemical liquid supply source 13 corresponding to the cuvette 15 on which such a determination is made, the chemical liquid may be supplied into the nozzle 11 as the cleaning liquid for the chemical liquid supply line 12, and the foreign substances included in the chemical liquid supply line 12 may be removed from the nozzle 11. That is, the chemical liquid supply line 12 is automatically cleaned. After this operation, the processing upon a next wafer W may be begun.

Figure 12:
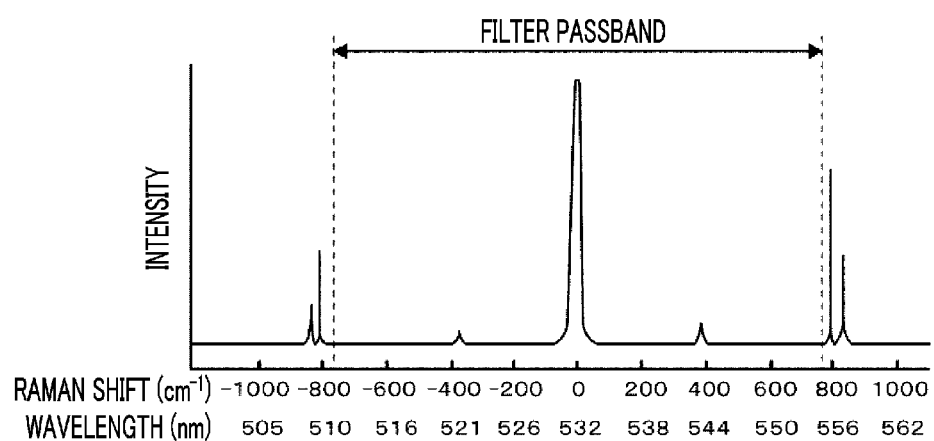
FIG. 12 is a graph showing another characteristic of the band pass filter.

As stated above in FIG. 6 and FIG. 7, however, the Rayleigh lights generated from the polymer 61 and the component (such as the thinner) of the resist other than the polymer 61 are guided to the light detector 40. Though the Stokes lights and the anti-Stokes lights generated from the polymer 61 and the component of the resist other than the polymer 61 are also irradiated toward the light detector 40, the component having the relatively large peak as shown in FIG. 7 becomes a relatively large noise in the output signal from the light receiving elements 45A (45B). Accordingly, as depicted in FIG. 12, by configuring the band pass filter 57 to have a passband wider than that in the example described in FIG. 7 to remove the component having such a peak, the aforementioned noise can be suppressed. In this band pass filter 57, the central wavelength is 532 nm and the half value width (FWHM) is, for example, 40 nm.

In case that the relatively large peak is included in the passband of the band pass filter 57 for the Stokes lights and the anti-Stokes light generated as the laser light from the laser light irradiator 51 is irradiated to the foreign substances, the level of the foreign substance detection signal is increased relatively. That is, by using the band pass filter 57 having the relatively large passband as shown in FIG. 12, most of the Rayleigh lights and the Raman scattered lights generated by the foreign substances can be guided to the light receiving elements 45A and 45B, so that the detection sensitivity for the foreign substances can be improved. If, however, the passband of the band pass filter 57 is too widened, the noise caused by the components of the resist such as the polymer 61 or the thinner cannot be suppressed. Thus, it is desirable to set the half value width of the band pass filter 57 to be equal to or less than 100 nm. Furthermore, since a molecular structure of the polymer contained in the chemical liquid varies depending on the kind of the chemical liquid, wavelengths at which peaks of the Stokes light and the anti-Stokes light caused by the corresponding polymer appear may be different between the chemical liquids of the different kinds. Furthermore, the wavelengths where the peaks appear may be different depending on a solvent constituting the chemical liquid. Thus, it is desirable to set this half value width appropriately in consideration of the kind of the target chemical liquid.

Figure 13:
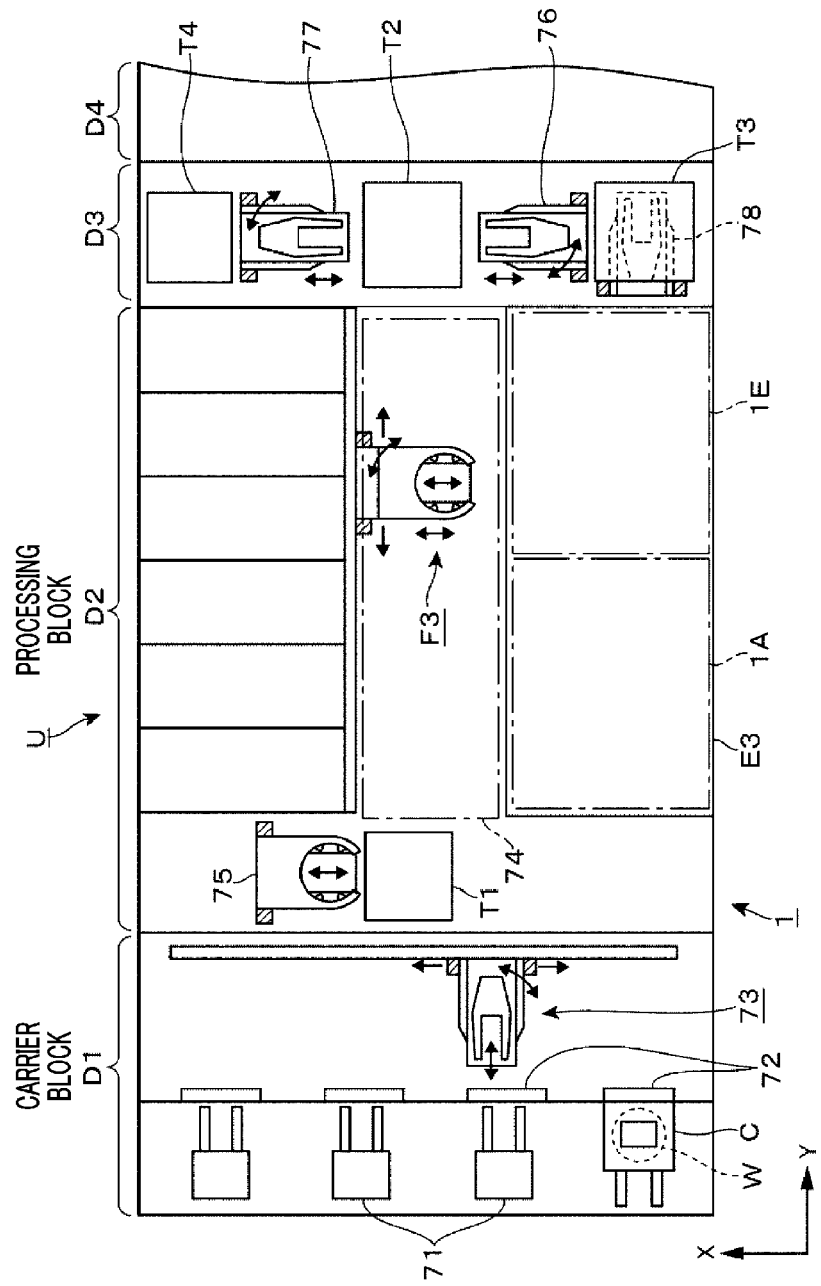
FIG. 13 is a plan view of the coating and developing apparatus.
Figure 14:
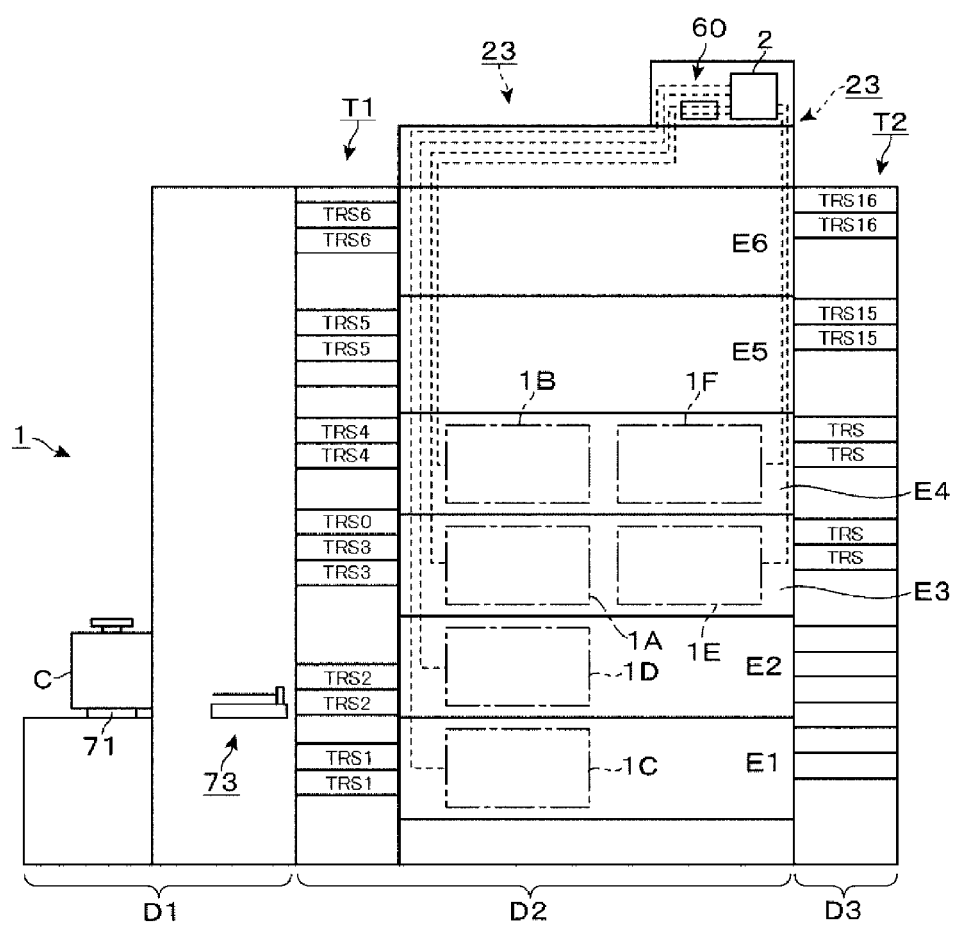
FIG. 14 is a schematic longitudinal side view of the coating and developing apparatus.

Now, a specific configuration example of the coating and developing apparatus 1 will be discussed with reference to FIG. 13 and FIG. 14. FIG. 13 and FIG. 14 are a plan view and a schematic longitudinal side view of the coating and developing apparatus 1, respectively. This coating and developing apparatus 1 includes a carrier block D1, a processing block D2 and an interface block D3 which are connected in a straight line shape. An exposure apparatus D4 is connected to the interface block D3. The carrier block D1 is configured to carry a carrier C into or out of the coating and developing apparatus 1 and equipped with a mounting table 71 for the carrier C, an opening/closing unit 72 and a transfer mechanism 73 configured to transfer the wafer W from the carrier C via the opening/closing unit 72.

The processing block D2 includes first to six unit blocks E1 to E6, which are stacked on top of each other in sequence from the bottom and configured to perform liquid processings on the wafer W. The unit blocks E1 to E6 are separated from each other and equipped with transfer mechanisms F1 to F6, respectively. In the respective unit blocks E (the first to sixth unit blocks E1 to E6), the transfers and the processings of wafers W are performed in parallel. Here, among the unit blocks, the third unit block E3 will be representatively explained with reference to FIG. 13. A transfer region 74 extends from the carrier block D1 toward the interface block D3, and the aforementioned transfer mechanism F3 is provided in the transfer region 74. Further, when viewed from the carrier block D1 toward the interface block D3, a shelf unit U is disposed at the left side of the transfer region 74. The shelf unit U is equipped with a heating module. Further, when viewed from the carrier block D1 toward the interface block D3, the aforementioned resist coating module 1A and protective film forming module 1E are arranged along the transfer region 74 at the right side of the transfer region 74.

The fourth unit block E4 has the same configuration as the third unit block E3 and is equipped with the resist coating module 1B and the protective film forming module 1F. The unit blocks E1 and E2 have the same configuration as the unit blocks E3 and E4 except that the antireflection film forming modules 1C and 1D are respectively provided therein instead of the resist coating modules 1A and 1B and the protective film forming modules 1E and 1F. Each of the unit blocks E5 and E6 is equipped with a developing module configured to develop a resist film by supplying a developing liquid onto the wafer W. The developing module has the same configuration as the modules 1A to 1F except that it supplies the developing liquid as the chemical liquid onto the wafer W.

A tower T1 vertically extending along the unit blocks E1 to E6 and a vertically movable transfer mechanism 75 configured to transfer the wafer W with respect to the tower T1 are provided at a carrier block D1 side within the processing block D2. The tower T1 is composed of a multiple number of modules stacked on top of each other, and these modules provided at the same heights as the unit blocks E1 to E6 are configured to transfer wafers W to/from the transfer mechanisms F1 to F6 of the unit blocks E1 to E6, respectively. These modules include transit modules TRS provided at the height positions of the respective unit blocks, a temperature control module CPL configured to perform a temperature control over the wafer W, a buffer module configured to temporarily accommodate therein a plurality of wafers W, a hydrophobizing module configured to hydrophobize a surface of the wafer W; and so forth. For the simplicity of explanation, illustration of the hydrophobizing module, the temperature control module and the buffer module is omitted.

The interface block D3 includes towers T2, T3 and T4 vertically extending along the unit blocks E1 to E6, and is equipped with a vertically movable transfer mechanism 76 configured to transfer the wafer W with respect to the tower T2 and the tower T3; a vertically movable transfer mechanism 77 configured to transfer the wafer W with respect to the tower T2 and the tower T4; and a transfer mechanism 78 configured to transfer the wafer W between the tower T2 and the exposure apparatus D4.

The tower T2 includes transit modules TRS, a buffer module configured to accommodate therein a plurality of wafers W before being subjected to an exposure processing, a buffer module configured to accommodate therein a plurality of wafers W after being subjected to the exposure processing, a temperature control module configured to perform the temperature control over the wafer W, and so forth. These modules are stacked on top of each other. Here, illustration of the buffer modules and the temperature control module is omitted.

The aforementioned light supply 2 is provided above the processing block D2, and the fiber 23 is wound downwards to be connected from the light supply 2 to the modules 1A to 1F of the unit blocks E1 to E4. Further, also provided above the processing block D2 is an operation unit 60 which constitutes the controller 6 and is configured to calculate the number of foreign substances for each channel, the total number of the foreign substances and the particle diameter of each foreign substance based on the output signals from the circuit unit 46 of each channel. The operation unit 60 and the modules 1A to 1F are connected via a non-illustrating wiring.

A transfer path of the wafer W in this coating and developing apparatus 1 will be explained. The wafer W is transferred by the transfer mechanism 73 from the carrier C into a transit module TRS0 of the tower T1 in the processing block D2. Then, the wafer W is transferred into either one of the unit block E1 and the unit block E2 from the transit module TRS0. By way of example, in case of delivering the wafer W into the unit block E1, the wafer W is delivered from the transit module TRS0 into, among the transmit modules TRS of the tower T1, a transmit module TRS1 corresponding to the unit block E1 (that is, the transit module to which the wafer W can be delivered by the transfer mechanism F1). In case of delivering the wafer W into the unit block E2, on the other hand, the wafer W is transferred from the transit module TRS0 into, among the transit modules TRS of the tower T1, a transit module TRS2 corresponding to the unit block E2. This transfer of the wafer W is performed by the transfer mechanism 75.

The wafer W delivered in this way is then transferred in the order of the transit module TRS1 (TRS2)→the antireflection film forming module 1C (1D)→the heating module→the transit module TRS1 (TRS2), and is then sent by the transfer mechanism 75 into either the transit module TRS3 corresponding to the unit block E3 or the transit module TRS4 corresponding to the unit block E4.

The wafer W sent to the transit modules TRS3 (TRS4) is then transferred in the order of the transit module TRS3 (TRS4)→the resist film coating module 1A (1B)→the heating module→the protective film forming module 1E (1F) →heating module→a transit module TRS of the tower T2. Thereafter, this wafer W is carried into the exposure apparatus D4 by the transfer mechanisms 76 and 78 via the tower T3. The wafer W after being exposed is transferred between the towers T2 and T4 by the transfer mechanism 78 and 77 and delivered into transmit modules TRS15 and TRS16 of the tower T2 corresponding to the unit blocks E5 and E6, respectively. Thereafter, the wafer W is transferred in the order of the heating module→the developing module→the heating module→the transmit module TRS5 (TRS6), and then, is returned back into the carrier C by the transfer mechanism 73.

Figure 15:
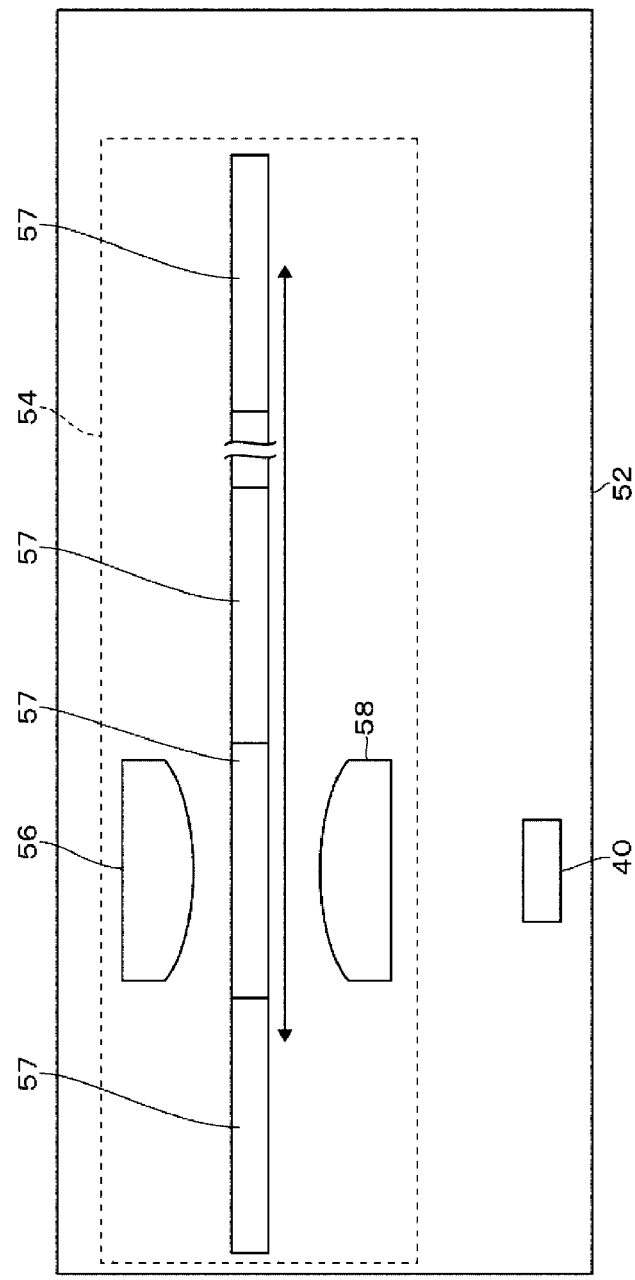
FIG. 15 is a plan view illustrating a light receiver of a forging substance detection unit having another configuration.

A wavelength shift amount when the laser light is irradiated to the polymer 61 depends on the molecular structure of the polymer 61. Thus, an appropriate passband of the band pass filter 57 for improving the S/N ratio in the light detector 40 depends on the kind of the chemical liquid. Therefore, it is desirable to provide the band pass filter 57 having the appropriate passband depending on the kind of the chemical liquid. FIG. 15 illustrates an example where the band pass filter 57 is provided to correspond to the chemical liquid as stated above in the light receiver 52 of the foreign substance detection unit 4. Though not illustrated, chemical liquids containing polymers of different compounds flow in these cuvettes 15A to 15K of this foreign substance detection unit 4. Eleven band pass filters 57 (only four are shown for the simplicity of illustration) are arranged at the light receiver 52 in the left-right direction to correspond to the cuvettes 15A to 15K, respectively.

The eleven band pass filters 57 are configured to be movable in the left-right direction in the light receiver 52 by a non-illustrated filter moving device provided in the light receiver 52, and the respective band pass filters 57 have individual passbands depending on the chemical liquids flowing in the cuvettes 15A to 15K. When the irradiation of the laser light to the cuvette 15 by the laser light irradiator 51 is performed, a band pass filter corresponding to the cuvette 15 to which the laser light is being irradiated among the eleven band pass filters is located between this cuvette 15 to which the laser light is irradiated and the light detector 40, so that the Raman scattered lights can be blocked.

Though each band pass filter 57 described above is configured to block the Stokes light and the anti-Stokes light among the Raman scattered lights, the band pass filter 57 may be configured to block only one of them. Further, as the filter unit of the present disclosure, a band block filter configured to block light of a preset wavelength may be provided besides the band pass filter configured to allow the light of a preset wavelength to pass therethrough.

Moreover, although the light scattering type particle counter using the forward scattered light is used in the exemplary embodiment, the present disclosure may also be applied to a particle counter in which a diffracted light (a diffraction pattern), which is generated as the laser light is irradiated to the foreign substances, is received by the light detector 40 and the foreign substances are detected based on the variation of the output signal by the reception of the diffraction pattern. Further, the exemplary embodiment may also be applied to a particle counter in which the detection is performed by a method called an IPSA method. That is, the exemplary embodiment is not particularly limited to a particle counter having a specific measurement principle.

The chemical liquid as a target of the foreign substance detection is not limited to the aforementioned resist and thinner. By way of example, the exemplary embodiment may be applied to the protective film forming modules 1E and 1F and the developing module, and foreign substances in the chemical liquid for forming the protective film or foreign substances in the developing liquid may be detected.

Besides, the exemplary embodiment may also be applicable to various other kinds of chemical liquid supply apparatuses such as a chemical liquid supply module (chemical liquid supply apparatus) configured to form an insulating film on the wafer W, a cleaning apparatus configured to supply a cleaning liquid as the chemical liquid for cleaning the wafer W and an apparatus configured to supply, as the chemical liquid, an adhesive for attaching a plurality of wafers W to each other.

Moreover, the present exemplary embodiment is not limited to being applied to the chemical liquid supply apparatus. By way of example, a cuvette 15 for a gas flow may be provided in the flow path array 16, provided separately from the cuvette 15 in which the chemical liquid is flown. An atmosphere of a region such as the transfer region 74 in which the wafer W is transferred in the coating and developing apparatus 1 may be introduced into the cuvette 15 for the gas flow by a suction pump or the like. The region in which the wafer W is transferred includes a region such as the resist coating module 1A in which the wafer W is processed. The same as in the case of detecting the foreign substances in the chemical liquid, the detection of the foreign substances may be performed by forming the optical path in the cuvette for the gas flow while the gas is being flown in the corresponding cuvette. Thus, according to the present exemplary embodiment, it is possible to detect the foreign substances contained in the liquid supplied to the wafer W, and it is also possible to detect the foreign substances contained in the ambient environment. That is, it is possible to detect foreign substances contained in a fluid. The present disclosure is not limited to the above-described exemplary embodiments, and the exemplary embodiments may be varied appropriately.

<Evaluation Tests>

Now, an evaluation test 1 conducted with respect to the present disclosure will be discussed. A chemical liquid is flown into the flow path 17 of the foreign substance detection unit 4, and a noise level (unit: mV) of a signal outputted to the controller 6 by irradiating the laser light to the flow path 17 from the laser light irradiator 51 is measured. This noise level is a difference between peaks of a voltage waveform. The band pass filter 57 is provided between the cuvette 15 and the light receiving elements 45A and 45B, the same as in the above-described exemplary embodiment. The central wavelength of the band pass filter 57 is 532 nm and the half value width thereof is 4 nm.

Experiments are conducted by selecting, as the chemical liquid to be supplied into the flow path 17, the thinner, the chemical liquid for forming the antireflection film and the resist. As evaluation tests 1-1 and 1-4, the thinner is used; as evaluation tests 1-2 and 1-5, the chemical liquid for forming the antireflection film is used; and as evaluations tests 1-3 and 1-6, the resist is used. Further, as comparative test 1, the same test as the evaluation test 1 is performed without providing the band pass filter 57. Specifically, tests conducted under the same conditions as those of the evaluation tests 1-1, 1-2, 1-3, 1-4, 1-5 and 1-6 except that the band pass filter 57 is not provided are referred to as comparative tests 1-1, 1-2, 1-3, 1-4, 1-5 and 1-6, respectively.

Figure 16:
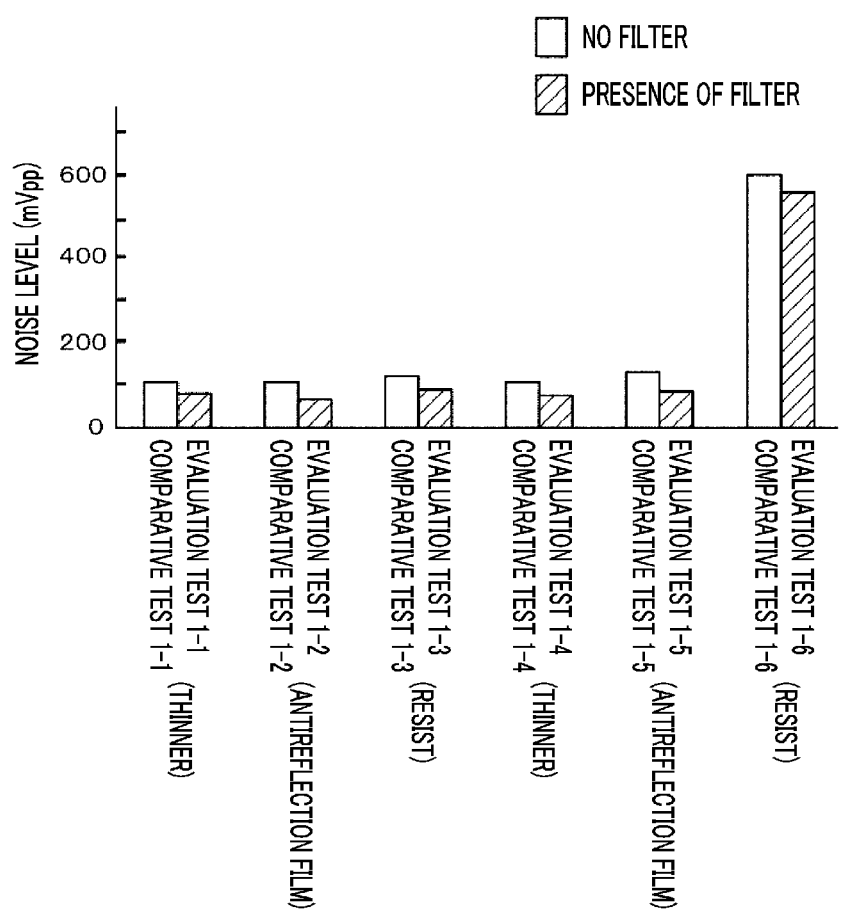
FIG. 16 is a graph showing a result of an evaluation test.

FIG. 16 provides bar graphs showing results of the evaluation test 1 and the comparative test 1. A vertical axis of the graph indicates the noise level. Bar graphs of the evaluation test 1 are marked by dashed lines, and bar graphs of the comparative test 1 are not assigned dashed lines. In the evaluation tests 1-1, 1-2, 1-3, 1-4, 1-5 and 1-6, the noise level is found to be 75.8 mV, 63.6 mV, 89.5 mV, 75.6 mV, 82.9 mV and 554.4 mV, respectively. In the comparative tests 1-1, 1-2, 1-3, 1-4, 1-5 and 1-6, the noise level is found to be 103.1 mV, 98.3 mV, 119.6 mV, 103.1 mV, 126.1 mV, 594.1 mV, respectively. As can be seen from these results, the noise level is reduced by providing the band pass filter 57 in all of the cases of using the thinner, the chemical liquid for forming the antireflection film and the resist as the chemical liquid. Thus, the effect of the present disclosure is found out from this evaluation test 1.

EXPLANATION OF CODES

1: Coating and developing apparatus
1A, 1B: Resist coating module
15A~15K: Cuvette
17A~17K: Flow path
4: Foreign substance detection unit
50: Detection region
51: Laser light irradiator
45A, 45B: Light receiving element
57: Band pass filter
6: Controller

We claim:

1. A foreign substance detection device configured to detect a foreign substance in a fluid supplied to a target object, the foreign substance detection device comprising:
a flow path array configured to form a flow path through which the fluid is flowing toward the target object;
a laser light irradiator configured to irradiate a laser light into the flow path in a state that the fluid is flowing through the flow path such that an optical path intersects with a flow direction of the fluid in the flow path;
a plurality of light receiving elements provided at the optical path having passed through the flow path;
a detector configured to detect the foreign substance in the fluid based on a signal outputted from the light receiving elements; and
a filter provided at the optical path between the light receiving elements and the flow path, and configured to block a Raman scattered light generated as the laser light is irradiated to the fluid from the laser light irradiator and allow a Rayleigh scattered light to be transmitted to the light receiving elements,
wherein the light receiving elements comprise a first light receiving element and a second light receiving element, and
the detector detects the foreign substance based on a signal corresponding to a difference between outputs from the first light receiving element and the second light receiving element.

2. The foreign substance detection device of claim 1, wherein the Raman scattered light blocked by the filter includes a Stokes light and an anti-Stokes light.

3. The foreign substance detection device of claim 1, wherein the fluid is a chemical liquid containing polymer configured to form a coating film on the target object, and
the filter blocks the Raman scattered light caused by the polymer.

4. The foreign substance detection device of claim 1, wherein the fluid is a liquid thinner.

5. The foreign substance detection device of claim 1, wherein the filter is a band pass filter, and a half value width of the band pass filter is equal to or less than 100 nm.

6. The foreign substance detection device of claim 1, wherein the plurality of light receiving elements including the first light receiving element and the second light receiving element are arranged in an array on a substrate.

7. A foreign substance detection method of detecting a foreign substance in a fluid supplied to a target object, the foreign substance detection method comprising:
supplying the fluid into a flow path array configured to form a flow path through which the fluid is flowing toward the target object;
irradiating laser light into the flow path by a laser light irradiator in a state that the fluid is flowing through the flow path such that an optical path intersects with a flow direction of the fluid in the flow path;
receiving the laser light by a plurality of light receiving elements provided at the optical path having passed through the flow path;
detecting the foreign substance in the fluid by a detector based on a signal outputted from the light receiving elements; and
blocking a Raman scattered light generated as the laser light is irradiated to the fluid from the laser light irradiator and allowing a Rayleigh scattered light to be transmitted to the light receiving elements by a filter provided at the optical path between the light receiving elements and the flow path array,
wherein the light receiving elements comprise a first light receiving element and a second light receiving element, and
the detecting of the foreign substance is performed based on a signal corresponding to a difference between outputs from the first light receiving element and the second light receiving element.

8. A non-transitory computer-readable recording medium having stored thereon computer-executable instructions that, in response to execution, cause a foreign substance detection device, which is configured to detect a foreign substance in a fluid supplied onto a target object, to perform a foreign substance detection method as claimed in claim 7.

* * * * *